Figure 1:
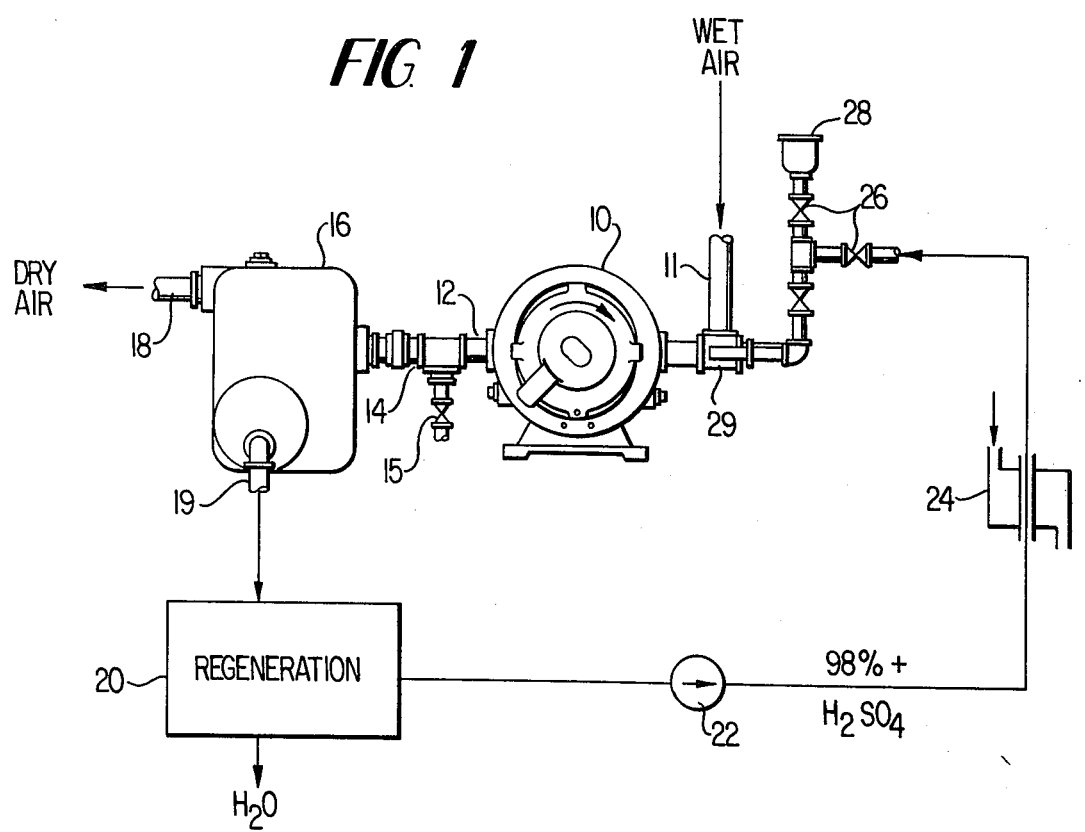

United States Patent [19]

Lowther

[11] 3,994,074

[45] Nov. 30, 1976

[54] LIQUID SEAL PUMP WITH SULFURIC ACID DEHUMIDIFICATION

[75] Inventor: Frank E. Lowther, Severna Park, Md.

[73] Assignee: W. R. Grace & Co., New York, N.Y.

[22] Filed: Apr. 18, 1975

[21] Appl. No.: 569,153

[52] U.S. Cl. .................................. 34/12; 34/72; 34/80; 55/32; 68/19.2
[51] Int. Cl.² .................................. F26B 7/00
[58] Field of Search ............... 34/9, 12, 72, 76, 80; 68/19.2; 55/32

[56] References Cited
UNITED STATES PATENTS

| | | |
|---|---|---|
| 2,947,379 | 8/1960 | Aubrey ............................ 55/88 |
| 3,188,283 | 6/1965 | Cole ............................... 204/129 |
| 3,421,289 | 1/1969 | Adams ............................. 55/88 |
| 3,651,617 | 3/1972 | Hodgson .......................... 55/32 |
| 3,780,499 | 12/1973 | Dorr et al. ........................ 55/73 |
| 3,807,053 | 4/1974 | Sylvan et al. ..................... 34/9 |

Primary Examiner—John J. Camby

[57] ABSTRACT

Fluid handling and dehumidification are combined in a process for drying and compressing wet gas concurrently. Incoming gas is compressed in a liquid seal pump with a liquid which consists essentially of concentrated sulfuric acid. The liquid may be regenerated to maintain a concentration greater than 98% $H_2SO_4$. Dry air having a dewpoint of −45° C or less can be obtained for use in industrial processes.

7 Claims, 2 Drawing Figures

U.S. Patent  Nov. 30, 1976  3,994,074

LIQUID SEAL PUMP WITH SULFURIC ACID DEHUMIDIFICATION

BACKGROUND OF THE INVENTION

This invention relates to handling gaseous fluids. In particular, it relates to improvements in compressing and drying air.

Many processes are known for dehumidifying gases for industrial use. While numerous industrial processes require low humidities, when the dewpoints required at the apparatus approach or fall below the freezing point, dehumidification can often be better produced with dehydration equipment. Such equipment permits the use of solid sorbents or liquid sorbents. Since removing water from air is the largest scale process, particular attention is directed to this gas.

Dehydration of air by liquid or solid sorbents is essentially adiabatic, and the enthalpy of the air remains essentially the same. Air leaving a dehydrator, therefore, is ordinarily at a higher temperature than the air entering. It is often necessary to provide an aftercooler for sensible-heat removal if lower gas effluent temperatures are required.

Solid-sorbent processes utilize the property of certain solid substances to adsorb water vapor. As the material fills with water, the attraction becomes balanced by the internal vapor pressure until an equilibrium condition is attained. The total weight of water that can be adsorbed is a function of the temperature of the material and the relative humidity of the air. When the temperature is raised or the humidity lowered, moisture is driven out. Solid sorbents include silica, alumina and molecular sieves.

These substances are utilized in either intermittent or continuous equipment. The air to be dehumidified is passed through the adsorber bed during the dehydration cycle. After adsorption of moisture the rate of removal becomes impaired and the bed is subjected to reactivation, during which moisture is driven off by direct firing or hot air. When reactivation is complete, the bed is cooled by outdoor air, to remove the residual activation heat. The moisture-laden air from the reactivation, and the air from the cooling part of the cycle, are discharged out-of-doors. In the intermittent process, two beds are operated to afford continuity of operation, one being on the dehydration cycle at the time the other one is reactivating and purging; dampers or valves effect the switch-over.

Liquid sorbents may also be used for low-humidity systems. The vapor pressure exerted by water depends on the temperature. Air remaining in contact with the water or water vapor absorbs moisture by evaporation until its vapor pressure comes into equilibrium with that of water. Many salts in aqueous solution have the property of markedly reducing the vapor tension exerted by the solution below that of pure water. Brines of calcium and lithium halides are used, either singly or in combination. Glycols and hygroscopic acids, such as phosphoric, sulfuric, etc., are also used as liquid sorbents. Besides having favorable vapor-pressure characteristics, the liquids used should not have a solidification curve too near the working range, must be ordorless, relatively noncorrosive, chemically stable, and reasonable in cost. The most serious application hazards are corrosion and carry-over from equipment.

The gas to be dried contacts the liquid, either by spray or wetted surface. As a result, the moisture content of air is reduced, the temperature of both brine and air is increased (by heat of condensation and dilution), and the concentration of the liquid is decreased. For reconcentration, the hygroscopic liquid may be heated and water is either boiled off or evaporated at a lower temperature in a reconcentrator. The liquid is then cooled to a temperature suitable for dehumidification, and the cycle is repeated.

SUMMARY

It has been found that wet gases can be dehumidified and compressed at the same time employing a liquid seal pump with concentrated sulfuric acid as the seal fluid. The use of 98% + $H_2SO_4$ to contact the wet gas during compression permits air to be dried to a dewpoint not greater than $-45°$ C. A continuous process is achieved where the moisture-laden sulfuric acid is removed from the pump and regenerated to remove the moisture, as by heat or electrolysis, thereby permitting return of concentrated sulfuric acid to the pump.

These and other advantages and features of the invention are shown in the following description and in the drawing.

DRAWING

Figure 2:
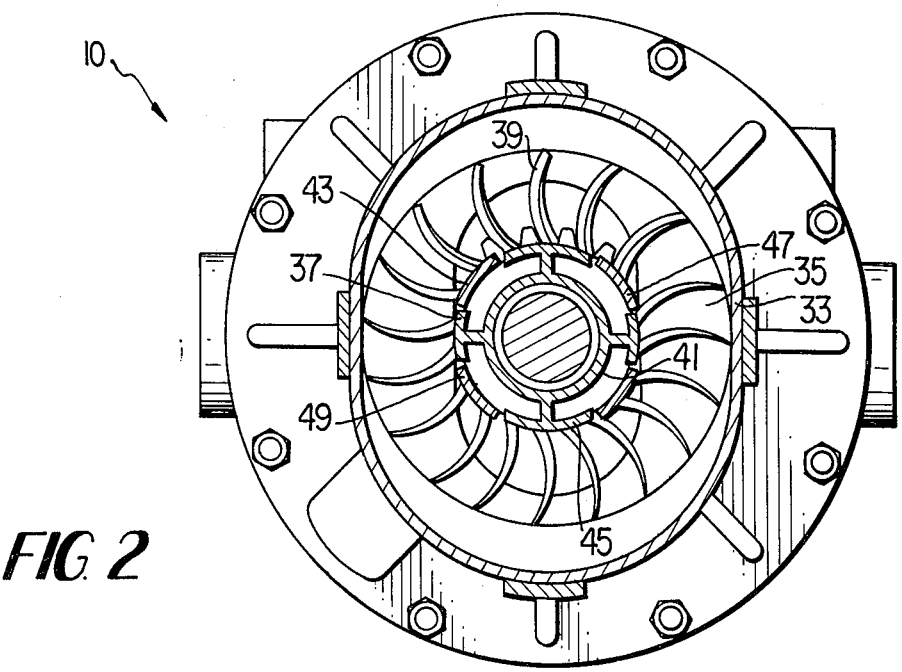

FIG. 1 is a schematic representation of a fluid handling system; and FIG. 2 is a vertical cross-section view of a typical liquid seal pump used in the process.

DESCRIPTION

Referring to FIG. 1, a liquid seal pump containing 98 to 100% $H_2SO_4$ liquid is employed concurrently as a compressor and drier. Wet air is passed to the pump through inlet 11 and exits through outlet 12. Pipe tee 14 permits fluid access through valve 15. The dry air and moisture-laden sulfuric acid are passed through separator 16. Dry air is recovered at discharge conduit 18. Sulfuric acid is removed by gravity from the separator through pipe 19, leading to regenerator 20 where water is removed. Pump 22 recycles 98+% $H_2SO_4$. If the regeneration step involves large thermal input, heat exchanger 24 may be used to cool the acid. Valves 26 priming funnel 28 and pipe tee 29 complete the fluid handling system.

If the water content is particularly high in the incoming gas, part of the air from the downstream side may be recycled through an auxiliary conduit between inlet 11 and outlet 12.

There are two basic types of liquid seal pumps: the eccentric shaft type and the elliptical stator type. Suitable liquid seal-type pumps are those disclosed in U.S. Pat. Nos. 2,461,865, 3,217,975, 3,289,918, 3,588,283, 3,712,764, and 3,883,315, incorporated herein by reference. These pumps are also known as liquid ring compressors or Nash pumps.

Referring now to FIG. 2, a diagrammatic sectional view of the liquid seal pump is shown. Such pumps are well known in the art (Nash-Hytor pump) and may be described as a centrifugal displacement type of pump having an elliptical casing 33 partly filled with liquid 35, in which a round, multi-blade rotor 37 revolves freely. Rotor 37 comprises a plurality of curved rotor blades 39 which project radially from the hub 41 and form, with the side shrouds, a series of buckets. Rotor 37 revolves in a clockwise direction at a speed high enough to throw the liquid out from the center by centrifugal force, so that there results a solid ring of liquid revolving in the casing 33 at the same speed as the rotor 37, but hugging the walls of the elliptical casing 37. This action causes the liquid to enter and recede from the buckets in the rotor at high velocity. Pump 10 also comprises a pair of inlet ports 43, 45 and a pair of discharge ports 47, 49. These ports are so placed in the cones shown in the figure that the expanding buckets draw gas from the inlet port, while the buckets in which the gas space is diminishing deliver the compressed gas to the outlet port. The drawing-in of gas, and discharge an instant later, takes place twice in one revolution.

Sulfuric acid is particularly useful as a liquid seal for a Nash-type pump because it is in the liquid phase over a wide range of operating temperature and pressure and has been used successfully as a liquid seal for pumping chlorine gas (dry). Its boiling point is higher than water. Since $H_2SO_4$ has a very strong affinity for water, special contacting apparatus, such as sprays, are not necessary.

It is preferred to employ a liquid sealing agent consisting essentially of sulfuric acid in a concentration greater than 98% $H_2SO_4$ to permit low dewpoint of product air. Under standard equilibrium conditions, 98% $H_2SO_4$ will provide a dewpoint of $-46°$ C, while 100% $H_2SO_4$ will give a dewpoint of $-68°$ C.

A small amount of $H_2SO_4$, about 3 ppm, may be carried over with the dry gas; however, this can be removed by scrubbing if it interferes with the industrial process utilizing the dry gas. This system is valuable in providing a dry feedgas for ozonizers. A typical ozone plant with inlet air at a dewpoint of 38° C will require an acid circulatory rate of about 4 liters/min.p and make-up of about 6 liters/month (per 1000 Kg/day of ozone) produced to replace the 3.1 ppm $H_2SO_4$ in the exit stream.

Sulfuric acid may be regenerated by heating above 100° C (e. g. — with steam) to drive off the absorbed moisture as vapor. Following this type of regeneration, cooling to ambient temperature is preferred.

The water may also be separated from sulfuric acid by electrolysis in a known manner. An electrolytic process for removing absorbed moisture from wet electrolytes is disclosed in U.S. Pat. No. 3,188,283.

While the invention has been shown by particular example, there is no intent to limit the inventive concept except as set forth in the following claims.

What is claimed is:

1. A method for drying and compressing gas which comprises:
   a. admitting a moisture-containing gas into a compression zone, said zone being sealed by concentrated sulfuric acid;
   b. compressing said gas in said zone whereby said gas is contacted with the acid and moisture is absorbed by the acid; and
   c. removing said gas from the compression zone as a dried gas stream.

2. The method of claim 1 wherein a stream of sulfuric acid is admitted and removed from said compression zone along with said gas, and said gas is separated from said acid.

3. The method of claim 2 wherein the moisture-containing sulfuric acid is dried and recycled to said compression zone.

4. The method of claim 3 wherein the moisture is removed by heating.

5. The method of claim 3 wherein the moisture is removed by electrolysis.

6. The method of claim 1 wherein the liquid seal is at least 98 wt% $H_2SO_4$.

7. The method of claim 1 wherein air is compressed and dried to a dewpoint not greater than about $-45°$ C.

* * * * *

UNITED STATES PATENT AND TRADEMARK OFFICE
CERTIFICATE OF CORRECTION

PATENT NO. : 3,994,074
DATED : November 30, 1976
INVENTOR(S) : Frank Eugene Lowther It is certified that error appears in the above-identified patent and that said Letters Patent are hereby corrected as shown below:

Column 2, line 55 after "compressors" delete [or Nash pumps] and insert therefore --and sold under the trademark "NASH" pumps--.

Column 2, line 58, after "art" delete [(Nash-Hytor pump)] and insert therefore --and sold under the trademarks "NASH" and "HYTOR" pumps, which are registered trademarks of Nash Engineering Company--.

Column 3, line 12 after "a" delete [Nash-type pump] and insert therefore --a pump such as sold under the trademark "NASH" pump--.

Signed and Sealed this

Twenty-fourth Day of May 1977

[SEAL]

Attest:

RUTH C. MASON
*Attesting Officer*

C. MARSHALL DANN
*Commissioner of Patents and Trademarks*